US009317837B2

(12) United States Patent
Cok (10) Patent No.: US 9,317,837 B2
(45) Date of Patent: Apr. 19, 2016

(54) DYNAMIC GRAPHIC INDICATOR FOR CONNECTED TASKS

(75) Inventor: Ronald S. Cok, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 832 days.

(21) Appl. No.: 12/725,499

(22) Filed: Mar. 17, 2010

(65) Prior Publication Data

US 2011/0231798 A1 Sep. 22, 2011

(51) Int. Cl.
*G06F 3/048* (2013.01)
*G06Q 10/10* (2012.01)
*G06F 3/0481* (2013.01)

(52) U.S. Cl.
CPC .......... *G06Q 10/103* (2013.01); *G06F 3/04817* (2013.01)

(58) Field of Classification Search
USPC .................................................. 715/823, 772
See application file for complete search history.

(56) References Cited

U.S. PATENT DOCUMENTS

| | | | | |
|---|---|---|---|---|
| 6,239,800 B1 * | 5/2001 | Mayhew et al. | ............... | 715/764 |
| 6,948,173 B1 * | 9/2005 | Isom | ............... | 719/316 |
| 6,968,505 B2 * | 11/2005 | Stoll | ............... | G06F 9/4446 |
| | | | | 715/712 |
| 7,299,418 B2 * | 11/2007 | Dieberger | ............... | 715/732 |
| 8,645,854 B2 * | 2/2014 | Kopycinski | ............ | G06Q 10/10 |
| | | | | 709/223 |
| 9,172,738 B1 * | 10/2015 | daCosta | .................. | H04L 67/00 |
| 2003/0005180 A1 * | 1/2003 | Schmit | ...................... | G06F 8/71 |
| | | | | 719/328 |
| 2007/0226746 A1 * | 9/2007 | Osaka | ................ | H04N 1/00915 |
| | | | | 718/106 |
| 2009/0222817 A1 * | 9/2009 | Faatz | ..................... | G06Q 10/06 |
| | | | | 718/100 |
| 2009/0235194 A1 | 9/2009 | Arndt et al. | | |
| 2010/0198776 A1 * | 8/2010 | Wang | ..................... | G06Q 10/00 |
| | | | | 706/58 |
| 2012/0079485 A1 * | 3/2012 | Kikuchi | ................ | G06Q 10/06 |
| | | | | 718/100 |

OTHER PUBLICATIONS

Caroline Jarrett et al., "Forms that Work: Designing Web Forms for Usability," Nov. 12, 2008, published by Morgan Kauffmann, pp. 105-108.*

* cited by examiner

*Primary Examiner* — Dino Kujundzic (57) ABSTRACT

A dynamic diagram for a set of connected tasks comprises icons in a graphic user interface, each icon representing a task, including a first task, a last task, and at least one intermediate task, the at least one intermediate task having at least two connected tasks one of which can optionally be immediately performed after the at least one intermediate task. Only one of the tasks is a current task represented by an active icon. Remaining tasks are represented by inactive icons. Two of the inactive icons, each representing one of the at least two connected tasks, are selectable as a new active icon representing a new current task; and first new-task indicators indicating the selectable inactive icons representing the at least two connected tasks.

25 Claims, 7 Drawing Sheets

DYNAMIC GRAPHIC INDICATOR FOR CONNECTED TASKS

FIELD OF THE INVENTION

The present invention relates to a Graphical User Interface for a dynamic diagram representing a set of connected tasks and, more particularly, to iconic representations and task indicators in the dynamic diagram.

BACKGROUND OF THE INVENTION

Complex tasks are often reduced to a set of connected tasks, each of which can be performed separately, that implement a process or achieve a computational goal. Each of the connected tasks can request that an operator or user make a decision or provide specific data. The data may be related to the decision or may be a group of related data that are organized to enhance understanding, efficiency, or facilitate decision making. Connected tasks are typically ordered in some fashion in that one task must be performed before or after another task, and that data or decisions made while performing one task can affect other tasks or the choice of subsequent tasks. A workflow diagram is often used to represent connected tasks and the relationships of the connected tasks.

Figure 10:
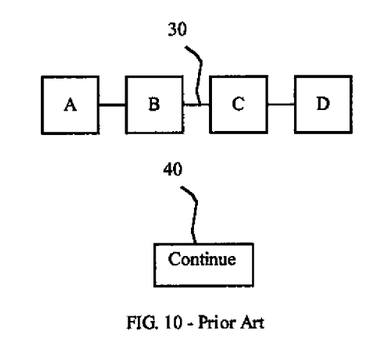
FIG. 10 is an illustration of a progress bar according to the prior art.

Graphical user interfaces can be employed to assist operators or users in understanding the order and structure of connected tasks. For example, computer-based user interfaces or Internet web-mediated browser interfaces can be used to provide such assistance. As illustrated in FIG. 10, a prior-art progress bar used in internet-based shopping websites to direct users through a purchasing process includes a first start task A, an end task D, and intermediate tasks B, C. The tasks are illustrated in the diagram of FIG. 10 as square icons. Connection indicators 30 help to illustrate the task flow between connected tasks. The start task A is the first task in the process and one or more intermediate tasks B, C are performed in an order after the start task A. After the intermediate tasks B, C are completed the end task D can be performed, indicating completion of the purchase process. The tasks can include, for example, making a product selection, choosing product options, entering customer information, and providing payment information. FIG. 10 illustrates the overall process through a spatially-ordered task diagram that locates sequential tasks shown as icons in spatially adjacent positions with connection indicators 30 that connect the spatially adjacent icons with a line to provide an appearance of a flow, as in a flow diagram. An operator can move from one task to the next task by selecting the "Continue" graphic button icon 40. Such icons, lines, and interactive graphic button icons are well known in the prior art.

Figure 11:
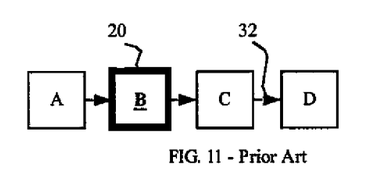
FIG. 11 is an illustration of an alternative progress bar according to the prior art.

In a slightly more complex progress bar seen in the prior art and shown in FIG. 11, a series of ordered tasks including a start task A to be performed first, intermediate tasks B, C to be performed in an order following the start task A, followed by an end task D are represented as icons connected with a next-task indicator 32 (illustrated as a directional arrow in FIG. 11). Each task is performed in the order specified by the arrows and the current task is highlighted as an active icon 20 (illustrated with a bold, underlined label and thicker icon lines in FIG. 11). The remaining icons A, C, D are inactive icons and so are not drawn in bold lines and labels.

Prior-art progress bar indicators can be useful, particularly for simple work flows that do not vary and have a completely fixed and unvarying task order. However, more complex, flexible, and dynamic task structures responsive to changes in operator input or task order are not supported by these prior art indicators. Other, more complex workflows are described in the prior art, for example in U.S. Patent Publication No. 20090235194 but do not teach simple graphic indicators useful for assisting operators or users to navigate a complex, flexible, and dynamic workflow.

There is a need, therefore, for an improved graphic indicator that provides useful information in a simple way for complex, flexible, and dynamic workflows and thereby reduces errors, improves understanding, and provides greater variation in input and task order for operators and users of the workflow.

SUMMARY OF THE INVENTION

In accordance with the present invention, there is provided a dynamic diagram for a set of connected tasks, comprising:

a) icons in a graphic user interface, each icon representing a task in a set of connected tasks, the set of connected tasks including a first task to be performed first, a last task to be performed last and at least one intermediate task to be performed after the first task and before the last task, the at least one intermediate task having at least two connected tasks one of which can optionally be immediately performed after the at least one intermediate task, wherein only one of the tasks in the set of connected tasks is a current task;

wherein only one of the icons is an active icon representing the current task and inactive icons are each representing one of the remaining tasks in the set of connected tasks, two of the inactive icons, each representing one of the at least two connected tasks, are selectable as a new active icon representing a new current task; and b) first new-task indicators indicating the selectable inactive icons representing the at least two connected tasks.

In another embodiment of the present invention, there is provided a method of performing a set of connected tasks, comprising the steps of:

a) displaying a set of icons in the dynamic diagram according to claim 1;

b) performing the current task corresponding to the active icon;

c) selecting one of the two inactive icons representing one of the at least two connected tasks for making the connected task represented by the selected inactive icon the new current task.

The present invention has the advantage that an operator or user can more readily perform a related series of tasks with less confusion and fewer errors for complex, flexible, and dynamic workflows with varying input and task order.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1A:
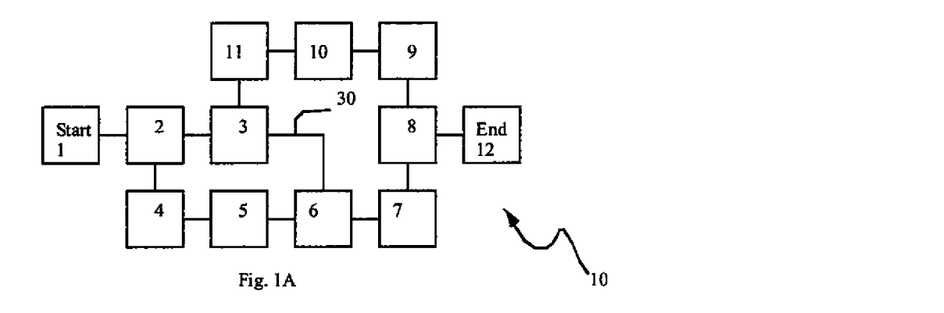
FIGS. 1A-1H are illustrations of a dynamic diagram with different active icons as connected tasks are sequentially performed according to an embodiment of the present invention.
Figure 1B:
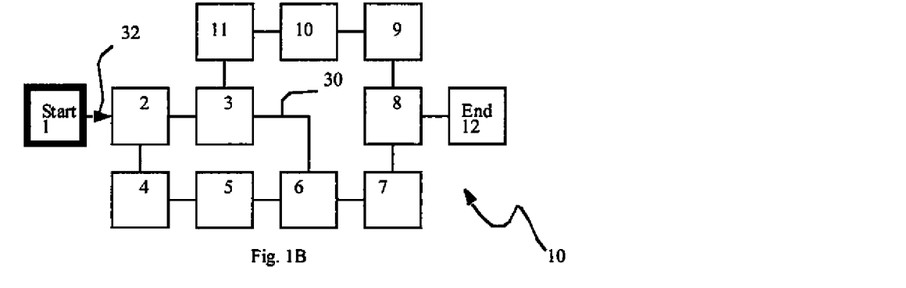

Referring to FIG. 1A, a set of connected tasks is represented by icons 1-12 in a dynamic diagram 10. The icons 1-12 are connected with connection indicators 30 that illustrate the relationship between connected tasks, for example showing that a task can be performed before or after another task to whose representative icon the task's representative icon is connected with a connection indicator 30. In this description, a task and the icon representing the task are shown as a single rectangle in the Figures and a task and the icon that represents the task are referred to interchangeably herein. A starting task 1 can be defined, as well as an ending task 12. Tasks performed after the starting task 1 and before the ending task 12 are referred to as intermediate tasks 2-11. The connection indicators 30 between the icons 1-12 illustrate a variety of paths through the dynamic diagram 10 from the first task 1 and the end task 12, and represent the various tasks that can be performed after the start task 1 and end task 12. According to various embodiments of the present invention, different tasks can be performed in different order after the start task 1 is performed and before the end task 12 is performed. The tasks can include data entry or other choices or decisions or steps or options in a step-through series of tasks. In particular, data supplied by and choices made by an operator or user to accomplish a task can determine which tasks are subsequently performed and in what order. It is even possible, as discussed below, that some tasks can be repeated, as desired by a user or operator, perhaps to make alternative choices at a later time than were made at an earlier time.

Figure 1C:
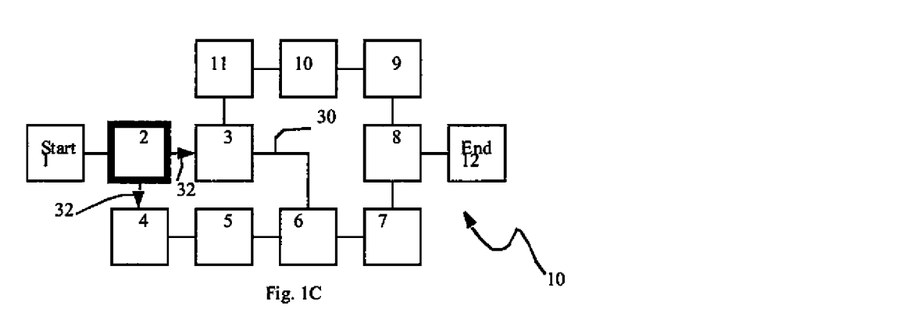

In an embodiment of the present invention illustrated in FIGS. 1A-1H, a dynamic diagram 10 for a set of connected tasks 1-12 comprises icons 1-12 in a graphic user interface, each icon 1-12 representing a task in a set of connected tasks 1-12. The set of connected tasks 1-12 includes a first task 1 to be performed first, a last task 12 to be performed last and at least one intermediate task 2-11 to be performed after the first task 1 and before the last task 12. For example, the intermediate task 2 has at least two connected tasks 3-4 one of which can optionally be immediately performed after the intermediate task 2, wherein only one of the tasks in the set of connected tasks is a current task represented by an active icon 2 illustrated in FIG. 1C. Only one of the icons 1-12 is an active icon such as 2 in FIG. 1C representing the current task and inactive icons 1, 3-11 in FIG. 1C are each representing one of the remaining or earlier tasks in the set of connected tasks. Two of the inactive icons 3-4, each representing one of two connected tasks, are selectable as a new active icon to be represented as a new current task (e.g. FIG. 1C). First new-task indicator 32 indicates the selectable inactive icon representing the two connected tasks 3 and 4. Optional connection indicators 30 can be used to illustrate connections between tasks and their representative icons.

As illustrated in the Figures, an active icon, shown in bold, for example icon 2 in FIG. 1C, represents the current task. The remaining icons are inactive and represented with inactive icons such as icons 3-12 in FIG. 1C. Some tasks are inactive tasks that can immediately follow the current task and are represented by inactive icons such as 3 and 4 connected by new-task indicators 32 to the active icon 2 in FIG. 1C. Connection indicators 30 can connect other inactive icons and can indicate the overall task structure in the dynamic diagram 10. The connection indicators 30 are optional, as illustrated in the GUI diagram of FIG. 6, and connect inactive icons, possibly to the active icon, or to other inactive connected icons. An inactive icon can also be connected with only one connection indicator 30. In an embodiment of the present invention, an icon can have no indicators.

The new-task indicators 32 can include directional elements, e.g. arrows, to improve understanding of process flow. The active icon 2 in FIG. 1C can be highlighted relative to the inactive icons in the graphic user interface, e.g. with heavier lines, bold text labels, blinking, alternate colors, etc., to indicate the current task and status to an operator. The depiction of an active icon can also be modified depending on the state of the represented task, for example when all information is entered into a current task, the icon can change in some fashion, for example by changing color or by a cessation of blinking. Likewise, the new-task indicators 32 can be highlighted with respect to the connection indicators 30, if present, e.g. by darker or heavier lines or by the appearance of an arrow. The connected tasks, e.g. current task, connected tasks, and remaining tasks can be visually differentiated in a graphic user interface with colors, as can the new-task and connection indicators, or by temporal attributes, such as blinking.

Figure 1D:
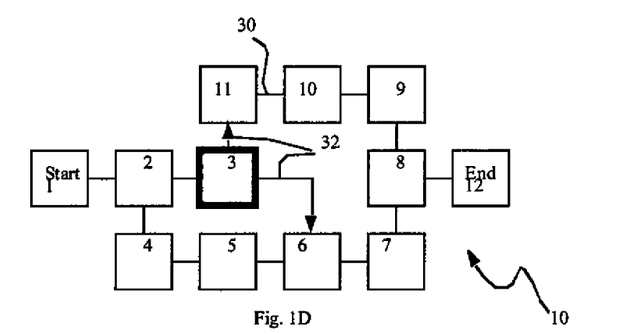
Figure 1E:
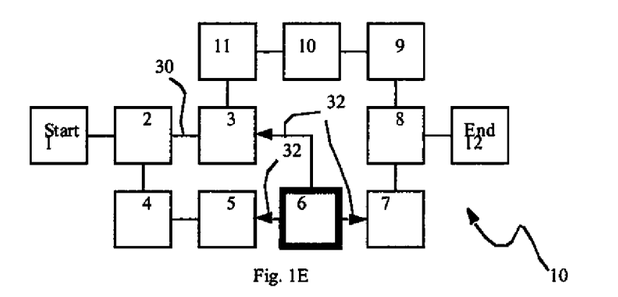
Figure 1F:
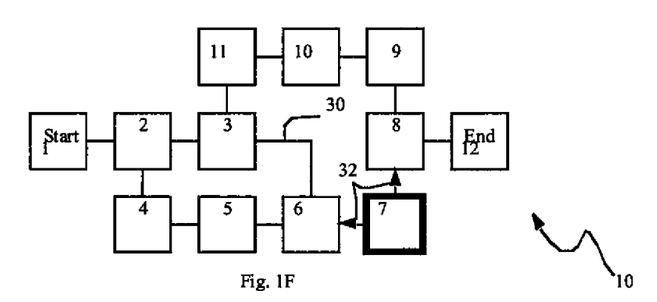
Figure 1G:
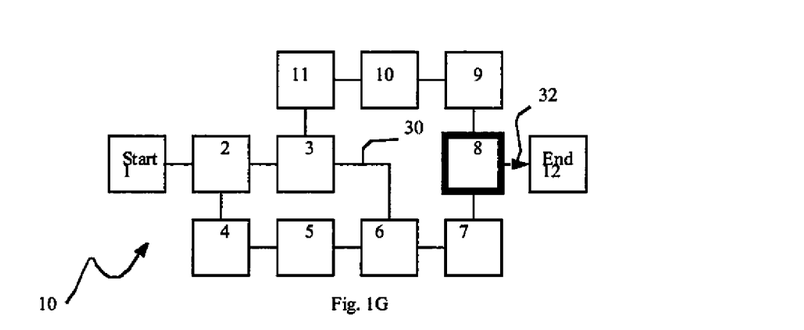
Figure 1H:
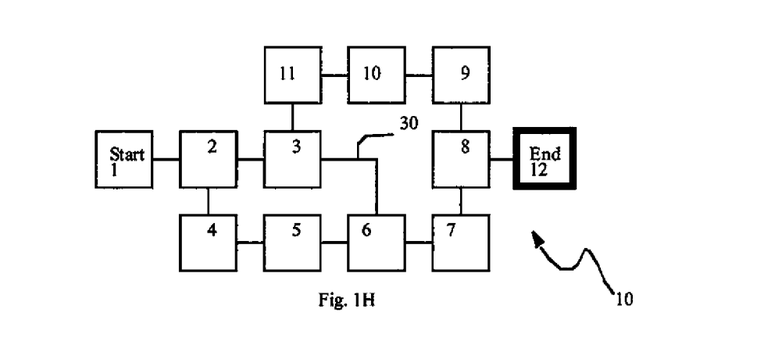
Figure 2A:
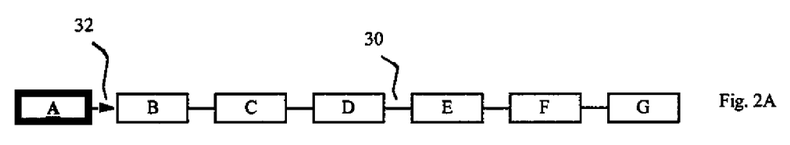
FIGS. 2A-2G are illustrations of a dynamic diagram with different active icons as connected tasks are performed according to another embodiment of the present invention.
Figure 2B:
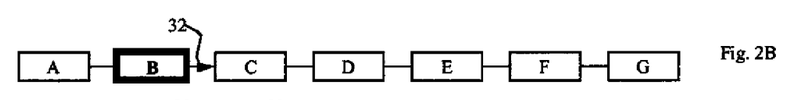
Figure 2C:
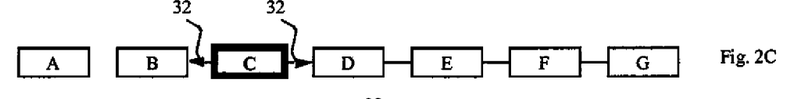
Figure 2D:
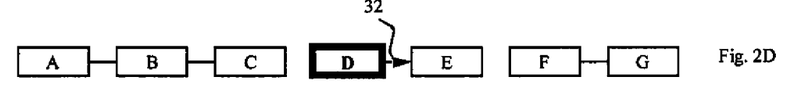
Figure 2E:
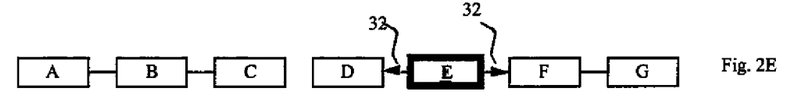
Figure 2F:
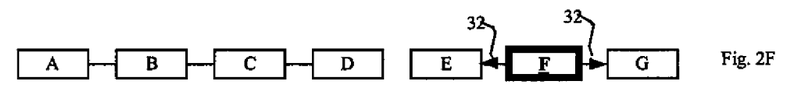
Figure 2G:
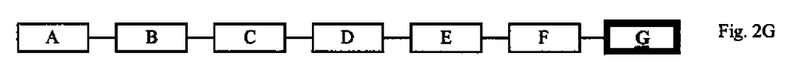

As indicated in FIGS. 1B through 1H, the icons in the dynamic diagram 10 change as progress is made through the tasks. Each new current task has associated new connected tasks that can be performed after the current task. This is illustrated by the highlighted active icon and the new-task indicators, illustrating to an operator which tasks can be performed next. In some cases, a task that has been performed can be repeated, as in FIG. 1E, where task 6 can be followed by task 3 as indicated by the indicator 32 connecting icon 6 and icon 3. In this example, task 3 can optionally be repeated because it was performed previously as shown in FIG. 1D. That is, the operator or user can back up, or be forced to back up, as a consequence of choices, data, or operational needs in the system represented by the dynamic diagram.

In an embodiment in which there is only one possible task selection that is performed after a current task, it can be possible to move to the next task automatically at the completion of the current task. In other embodiments, a new task can be selected before the current task is completed. The current task may be completed later or, if an alternative branch is chosen, it may not be necessary to complete.

The dynamic diagram 10 of the present invention is usefully employed in a graphic user interface. An icon representing a task that can be performed after a previous task can be located adjacent to the icon representing the previous task. The icons can be spatially arranged in an order corresponding to an order of performance of the tasks. Thus, as shown in the Figures, the layout of the icons in the dynamic diagram 10 conforms to the order of task performance. In some embodiments of the present invention, the spatial arrangement of the icons can be modified as the tasks are completed, or icons may be removed or added to the dynamic diagram, together with appropriate indicators.

In one embodiment of the present invention, all of the tasks in the set of connected tasks are performed sequentially. Referring to FIGS. 2A-2G, the tasks labeled A through G are represented by corresponding icons, including a first task A, an end task G, and intermediate tasks B-F. The tasks are performed sequentially with no branching; the only selection choices are a single following task or the immediately prior task. The active icon A representing the current task at each step is highlighted in darker lines with bold, underlined labels. The subsequent connected tasks are indicated for each current task with indicator 32 and, in this linear, sequential embodiment can only be one following task or the prior task. As illustrated in FIGS. 2A-2G, in this example, the tasks are performed sequentially with no repetition of prior tasks. However, tasks C, E, and F have two connected tasks illustrated by double indicators 32, indicating that an operator or user could back up to steps B, D, and E, respectively, after tasks C, E, F are performed. The remaining tasks have only one following connected task indicated by a single indicator 32. The dynamic diagram of FIGS. 2A-2G is considered herein to be a linear system that is partially bidirectional, indicating that the only task choice is a following task or a prior task, the prior task being only available for some tasks.

Figure 3:
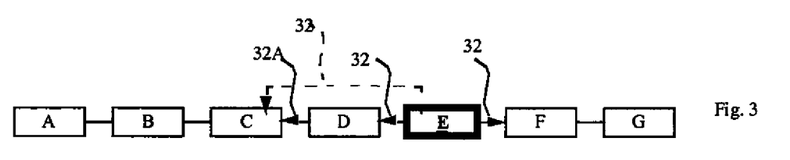
FIG. 3 is an illustration of a dynamic diagram with an active icon representing a current task according to an alternative embodiment of the present invention.

In one embodiment of the present invention, a new-task indicator 32 may connect an icon that is not spatially adjacent, as illustrated in FIG. 3 with the dashed arrow. As shown in FIG. 3, an active icon E representing an intermediate current task is connected with new-task indicators 32 to connected tasks F, D, and C. The icon representing task C is not spatially adjacent to the active icon E representing the current task. A dashed new-task indicator 32 is shown and could be employed. However, for a linear bidirectional set of tasks, such an indicator may not be preferred and the new-task indicator 32A connecting the icons representing tasks D and C can be preferred.

Figure 4:
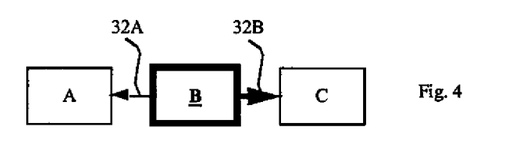
FIG. 4 is an illustration of a dynamic diagram with an active icon representing a current task and a highlighted new-task indicator according to an alternative embodiment of the present invention.

In another embodiment of the present invention illustrated in FIG. 4 having first task A, end task C, and intermediate task B, and a highlighted active icon B and inactive icons A, C, one new-task indicator 32B can be highlighted relative to another new-task indicator 32A. Such highlighting can indicate a preferred or recommended choice.

Figure 5:
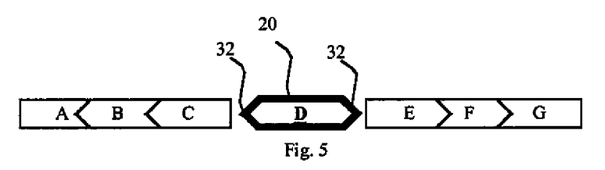
FIG. 5 is an illustration of a dynamic diagram with new-task indicators and an active icon according to an alternative embodiment of the present invention.
Figure 6:
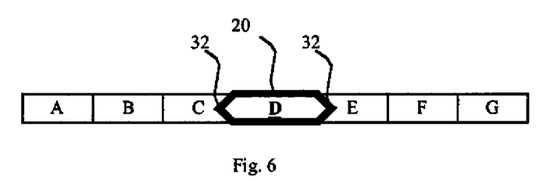
FIG. 6 is an illustration of a dynamic diagram with new-task indicators according to another embodiment of the present invention.

The iconic representation of tasks with rectangles and indicators with arrows is only a convention employed for clarity in the Figures. Other iconic representations and indicators can be used. Referring to FIG. 5, polygons with pointed ends can be used to illustrate both a task and a new-task indicator. In FIG. 5, the active icon 20 representing an intermediate task D is highlighted with a bold underlined label and a heavy border and new-task indicators 32 formed by the intersection of two lines of the polygon 20, one pointing to the right toward task E and one pointing to the left toward task C. Similarly formed connection indicators 30 formed as part of the inactive icons B, C, E, F, include a direction as well, contributing to the idea of a bidirectional linear flow of sequential tasks. FIG. 6 illustrates a graphical variation of inactive icons A-C and E-G, an active icon 20 with new-task indicators 32 and connected tasks 24 but without directional indicators for the inactive tasks.

Figure 7A:
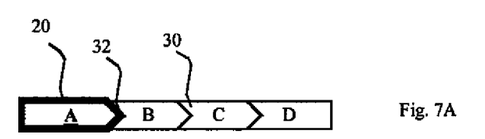
FIGS. 7A-7F are illustrations of a dynamic diagram with different active icons as different connected tasks are performed and having two tasks performed twice according to an embodiment of the present invention.
Figure 7B:
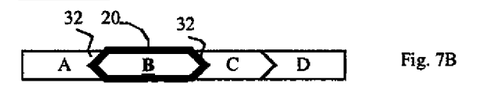
Figure 7C:
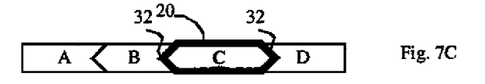
Figure 7D:
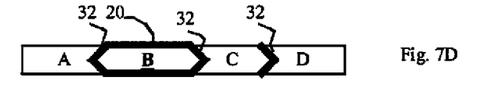
Figure 7E:
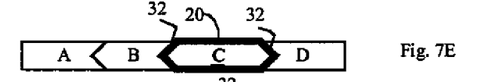
Figure 7F:
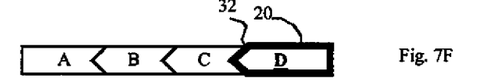

FIGS. 7A-7F illustrate a complete process of task performance for a bidirectional linear set of connected tasks, beginning with a first task A illustrated with an active icon 20 and a directional new-task indicator 32 indicating that task B is the only subsequent choice. Intermediate tasks B-C are illustrated with inactive icons, and connected with connection indicator 30, as is last task D. Both tasks A and C can follow second task B, illustrated by the new-task indicators 32 (FIG. 7B). If task A is selected, a display of the graphic of FIG. 7A can be repeated. FIG. 7C illustrates that task C is selected since the bolded active icon 20 is C. As with task B, task C can be followed by two tasks, B and D, indicated by the new-task indicators 32. Task B is chosen, as shown in FIG. 7D and then task C is chosen again, as shown in FIG. 7E. This repeating of task B could be, for example, part of a purchase process in which a user changes his or her mind to select a different product. If task C was completed the first time (FIG. 7C), a user might select task D (since the new-task indicator shows that task D can be performed next), without choosing task C again. For example a user might select a product in task B and enter shipping information in task C. If task C was completed before the user determined to modify choices made in task B, task D (e.g. entering financial information) could be performed immediately after task B was completed for the second time. This is illustrated in FIG. 7D by the highlighted right hand end of polygon C. If, on the other hand, task C was not completed (in FIG. 7C), the new-task indicator connecting task B directly to task D would not be employed and a user would be forced to complete task C. In this case (FIG. 7E), the user chooses task C again, perhaps to modify shipping information for a different product (selected in task B illustrated in FIG. 7I) in accordance with the example employed here). Task D (FIG. 7F) is then performed after task C. Since the new-task indicator 32 associated with task D indicates that task C can be performed again, the user might still modify previous decision or data entry performed in earlier tasks.

Figure 8:
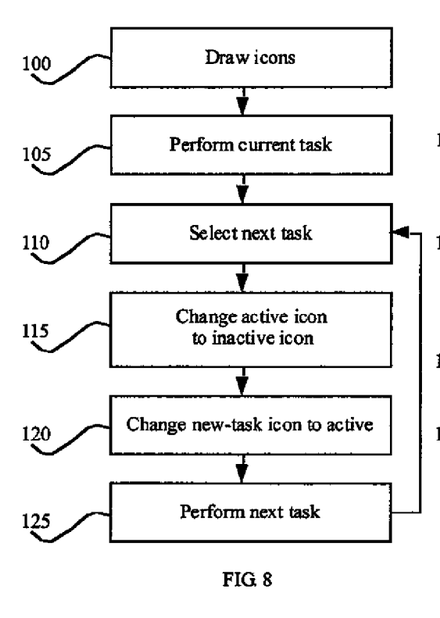
FIG. 8 is a flow graph of a method according to an embodiment of the present invention.

One example of a method according to one embodiment of the present invention is illustrated in FIG. 8. A graphic user interface draws icons in step 100, at least one of which indicates a current task represented by an active icon. An operator performs the current task in step 105 and selects a next task in step 110 as indicated by a connected task. The active icon representing the current task is redrawn as an inactive icon in step 115. The inactive icon representing the new task is changed to an active icon in step 120, and the next task represented by the active icon is performed in step 125.

Figure 9:
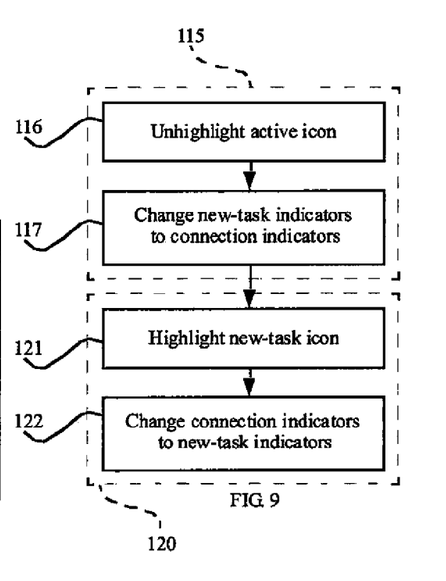
FIG. 9 is a flow graph of a portion of the method of FIG. 8 with greater detail according to an embodiment of the present invention.

Steps 110 through 125 can be repeated until the next task is the end task. The steps 115 and 120 are shown in more detail in FIG. 9, in which the active icon is redrawn without a highlight in step 116. The new-task indicators are changed to connection indicators in step 117. The icon representing the new task is redrawn as an active, highlighted icon in step 121 and the connection indicators for the new task are changed to new-task indicators in step 122.

The selection of tasks can be performed in a variety of ways. One simple technique is to select the icon representing the desired task with a mouse-controlled cursor. The selectability of the icons can be controlled in accordance with the new-task indicators to further assist an operator or user. In an alternative embodiment of the present invention, a selectable graphic button icon, e.g. buttons labeled "Next" or "Previous" can be employed to indicate the desired task choice, or "Continue" and "Go Back" button labels used. If more or fewer choices are indicated, more or fewer graphic buttons or selectable icons can be provided. This is particularly useful for sequential, linear tasks. Task selection can also be controlled through a command line interface, for example in a conventional UNIX computing environment. More advanced systems could include speech recognition capability that allows an operator or user to provide a verbal command corresponding to the selectable task choices. An even more advanced method can use a neuronal command corresponding to the one of the two selectable icons entered through a neuronal activity detector.

The present invention can be employed to implement a wide variety of connected tasks. One task, especially useful in web-site interactions for e-commerce is the selection of a product. Other tasks can include the entry of personal information, and the provision of financial information.

The present invention has the advantage of supporting a wider variety of functional task sets, especially when mediated through the internet, that is simple, easy-to-understand, and flexible. The dynamic GUI diagram of the present invention informs the user of a current task state and enables different choices or data to affect the task selection and workflow without confusion. The dynamic diagram allows indicators, or indeed even tasks, to appear and disappear as needed within the dynamic workflow, to clarify the user's possible actions and reduce unnecessary information and avoid information overload.

The invention has been described in detail with particular reference to certain preferred embodiments thereof, but it will be understood that variations and modifications can be effected within the spirit and scope of the invention.

PARTS LIST 10 dynamic diagram
12 start task
14 intermediate task
16 end task
18 icon
20 active icon, current task
22 inactive icon
24 connected task, connected icon
30 connection indicator
32, 32A, 32B new-task indicator
40 graphic button
100 draw icon step
105 perform current task step
110 select new task step
115 change current-task icon step
116 un-highlight current-task icon step
117 change new-task indicators to connection indicators step
120 change next-task icon step
121 highlight next-task icon step
122 change connection indicators to new-task indicators step
125 perform next task

The invention claimed is:

1. A method comprising,
displaying, on a display, a plurality of tasks, wherein each of the plurality of tasks is displayed as an icon, and wherein the plurality of tasks comprises a starting task, one or more intermediate tasks, and a final task;
determining, using a processor, one or more first subsequent tasks for the starting task;
indicating a first process flow for the plurality of tasks by connecting, using a visual indication on the display, the starting task to each of the one or more first subsequent tasks;
determining, using the processor, one or more second subsequent tasks for each of the one or more intermediate tasks;
modifying the first process flow to indicate a second process flow for the plurality of tasks by connecting, using the visual indication on the display, each of the one or more intermediate tasks with a respective one or more second subsequent tasks, wherein at least one of the second subsequent tasks connects to the final task;
automatically determining, using the processor, a current task from the plurality of tasks;
indicating on the display the current task; and
adding, using the processor, a directional element to each of the one or more second subsequent tasks immediately after, and if previously performed, immediately before, the current task, wherein the directional element indicates the second process flow for the plurality of tasks, and wherein only the one or more subsequent tasks immediately after, and if previously performed, immediately before, the current task are selectable and have the directional element, while all other tasks in the plurality of tasks are deselected and their directional element, if any, is removed.

2. The method of claim 1, further comprising:
receiving an indication that the current task has been completed;
receiving a selection of a next task from the plurality of tasks, wherein the one or more subsequent tasks associated with the current task comprises the next task;
removing, using the processor, the indication from the current task;
removing, using the processor, the directional elements from the one or more subsequent tasks associated with the current task;
indicating on the display the next task; and
adding, using the processor, the directional element to each of the one or more subsequent tasks associated with the next task.

3. The method of claim 1, wherein at least one task of the one or more subsequent tasks associated with the next task has previously been completed.

4. The method of claim 1, further comprising:
receiving information associated with the current task; and
receiving an indication that the current task has been completed.

5. The method of claim 4, wherein the receiving information comprises a selection of a product, financial information, or personal information.

6. The method of claim 4, wherein at least one of the one or more second subsequent tasks for each of the one or more intermediate tasks are based on the received information.

7. The method of claim 1, wherein one or more tasks are not displayed based upon the current task.

8. The method of claim 1, wherein the plurality of tasks are spatially arranged in an order corresponding to the process flow.

9. The method of claim 1, wherein the icons are indicated as polygons with pointed ends that are spatially arranged in an order corresponding to an order of performance of the tasks and the spatial arrangement of the icons are modified as the tasks are completed.

10. A system comprising,
a display configured to display a plurality of tasks, wherein each of the plurality of tasks is displayed as an icon, and wherein the plurality of tasks comprises a starting task, one or more intermediate tasks, and a final task; and
one or more processors configured to:
determine one or more first subsequent tasks for the starting task;

indicate a first process flow for the plurality of tasks by connecting, using a visual indication on the display, the starting task to each of the one or more first subsequent tasks;

determine one or more second subsequent tasks for each of the one or more intermediate tasks;

modify the first process flow to indicate a second process flow for the plurality of tasks by connecting, using the visual indication on the display, each of the one or more intermediate tasks with a respective one or more second subsequent tasks, wherein at least one of the second subsequent tasks connects to the final task;

determine a current task from the plurality of tasks;

indicate the current task; and add a directional element to each of the one or more second subsequent tasks immediately after, and if previously performed, immediately before, the current task, wherein the directional element indicates the second process flow for the plurality of tasks, and wherein only the one or more subsequent tasks immediately after, and if previously performed, immediately before, the current task are selectable and have the directional element, while all other tasks in the plurality of tasks are deselected and their directional element, if any, is removed.

11. The system of claim 10, wherein the one or more processors are further configured to:

receive an indication that the current task has been completed;

receive a selection of a next task from the plurality of tasks, wherein the one or more subsequent tasks associated with the current task comprises the next task;

remove the indication from the current task;

remove the directional elements from the one or more subsequent tasks associated with the current task;

indicate the next task; and add the directional element to each of the one or more subsequent tasks associated with the next task.

12. The system of claim 10, wherein at least one task of the one or more subsequent tasks associated with the next task has previously been completed.

13. The system of claim 10, wherein the one or more processors are further configured to:

receive information associated with the current task; and receive an indication that the current task has been completed.

14. The system of claim 13, wherein the information associated with the current task comprises a selection of a product, financial information, or personal information.

15. The system of claim 13, wherein at least one of the one or more second subsequent tasks for each of the one or more intermediate tasks are based on the received information.

16. The system of claim 10, wherein one or more tasks are not displayed based upon the current task.

17. The system of claim 10, wherein the plurality of tasks are spatially arranged in an order corresponding to the process flow.

18. A non-transitory computer-readable medium having instructions stored thereon, the instructions comprising, instructions to a display a plurality of tasks, wherein each of the plurality of tasks is displayed as an icon, and wherein the plurality of tasks comprises a starting task, one or more intermediate tasks, and a final task;

instructions to determine one or more first subsequent tasks for the starting task;

instructions to indicate a first process flow for the plurality of tasks by connecting, using a visual indication on the display, the starting task to each of the one or more first subsequent tasks;

instructions to determine one or more second subsequent tasks for each of the one or more intermediate tasks;

instructions to modify the first process flow to indicate a second process flow for the plurality of tasks by connecting, using the visual indication on the display, each of the one or more intermediate tasks with a respective one or more second subsequent tasks, wherein at least one of the second subsequent tasks connects to the final task;

instructions to determine a current task from the plurality of tasks;

instructions to indicate the current task; and instructions to add a directional element to each of the one or more second subsequent tasks immediately after, and if previously performed, immediately before, the current task, wherein the directional element indicates the second process flow for the plurality of tasks, and wherein only the one or more subsequent tasks immediately after, and if previously performed, immediately before, the current task are selectable and have the directional elements, while all other tasks in the plurality of tasks are deselected and their directional element, if any, is removed.

19. The non-transitory computer-readable medium of claim 18, wherein the instructions further comprise:

instructions to receive an indication that the current task has been completed;

instructions to receive a selection of a next task from the plurality of tasks, wherein the one or more subsequent tasks associated with the current task comprises the next task;

instructions to remove the indication from the current task;

instructions to remove the directional elements from the one or more subsequent tasks associated with the current task;

instructions to indicate the next task; and instructions to add the directional element to each of the one or more subsequent tasks associated with the next task.

20. The non-transitory computer-readable medium of claim 18, wherein at least one task of the one or more subsequent tasks associated with the next task has previously been completed.

21. The non-transitory computer-readable medium of claim 18, wherein the instructions further comprise:

instructions to receive information associated with the current task; and instructions to receive an indication that the current task has been completed.

22. The non-transitory computer-readable medium of claim 21, wherein the receiving information comprises a selection of a product, financial information, or personal information.

23. The non-transitory computer-readable medium of claim 21, wherein at least one of the one or more second subsequent tasks for each of the one or more intermediate tasks are based on the received information.

24. The non-transitory computer-readable medium of claim 18, wherein one or more tasks are not displayed based upon the current task.

25. The non-transitory computer-readable medium of claim 18, wherein the plurality of tasks are spatially arranged in an order corresponding to the process flow.

\* \* \* \* \*